POWER AMPLIFIER SIMULTANEOUS CONDUCTION PREVENTION CIRCUIT

Filed Oct. 16, 1967

INVENTOR
ROBERT R. WEBB
BY Thomas [signature]
ATTORNEY

United States Patent Office
3,448,395
Patented June 3, 1969

3,448,395
POWER AMPLIFIER SIMULTANEOUS CONDUCTION PREVENTION CIRCUIT
Robert R. Webb, Los Angeles, Calif., assignor to Ampex Corporation, Redwood City, Calif., a corporation of California
Filed Oct. 16, 1967, Ser. No. 675,476
Int. Cl. H03f *3/18, 3/26, 3/68*
U.S. Cl. 330—13 5 Claims

ABSTRACT OF THE DISCLOSURE

A circuit network for preventing simultaneous conduction of two parallel connected stages each responsive to signals of opposite polarity. The network includes sensing means which sense the conductive state of each stage. When one stage is conducting, a gate network responds to the sensed signal of the conducting side and places the other side in a non-conductive state and holds it in a non-conductive state until said conducting stage ceases conduction.

*Background of the invention*

The present invention pertains to a network which protects against simultaneous conduction of two circuits which are responsive to signals of opposite polarity. Although it will be apparent to those skilled in the art that the present invention is applicable to various circuit arrangements, it has been found to be highly beneficial in Class B amplifiers. It may be said that theoretically simultaneous conduction in both sides of a Class B amplifier should not occur, however, as a practical matter this is not the case. For example, if a component failure or other defect occurs in one side of the Class B amplifier, other components may become overloaded causing component failure on the other side. Also, if the frequency of the input signal is too high both sides may tend to follow the input signal and conduct simultaneously. Consequently, it is desirable to incorporate means which will safeguard against simultaneous conduction in both sides.

*Summary of the invention*

Viewing the present invention as incorporated in a Class B amplifier, it provides a rapid responding circuit network preventing simultaneous conduction in the opposing sides. The network includes a signal sensing means for sensing the conductive state of each side of the Class B amplifier. When one side is conducting, the sensor senses such condition and supplies a responsive signal to a gate network which responds in such a manner that the other side is placed in a non-conductive state and remains so until the responsive signal ceases.

In preferred embodiments, hereinafter described in detail, the output of each side is sensed by a sensing network. Designating the sides of the Class B amplifier as Side One and Side Two, when Side One conducts the sensor senses the output and provides a responsive signal back to a gating network associated with Side Two. The gating network extends across the input of Side Two of the Class B amplifier. When the responsive signal is received by the gate of Side Two, the gate conducts thereby providing a low impedance path bypassing the driver stage of Side Two and preventing it from going into a conductive state. The gate of Side Two remains in the conductive condition until the signal of the output of Side One ceases. Similarly, when Side Two conducts the output sensor senses the output from Side Two and provides a responsive signal to the gate on Side One. The gate on Side One responds, thereby providing a low impedance path bypassing the driver stage of Side One and preventing it from going into a conductive state.

The present invention has proven highly feasible both from a performance standpoint as providing a pure output signal responsive to an input signal and from an economic standpoint. As is commonly known in the art, components in power amplifiers are relatively expensive. In prior art structures known to the inventor, when simultaneous conduction occurs in both sides due to component failures or other causes on one side, heavy loads are imposed on the other side of the amplifier. The overload frequently results in destruction of components on both sides of the circuit. Consequently, it is costly economically and timewise to replace the destroyed components. The present invention provides a network which continuously senses the conductive state of each side and protects against simultaneous conduction. Thus, when overloads arise on one side, the other side is protected against similar overloads.

*Description of the preferred embodiment*

Figures 1, 2:
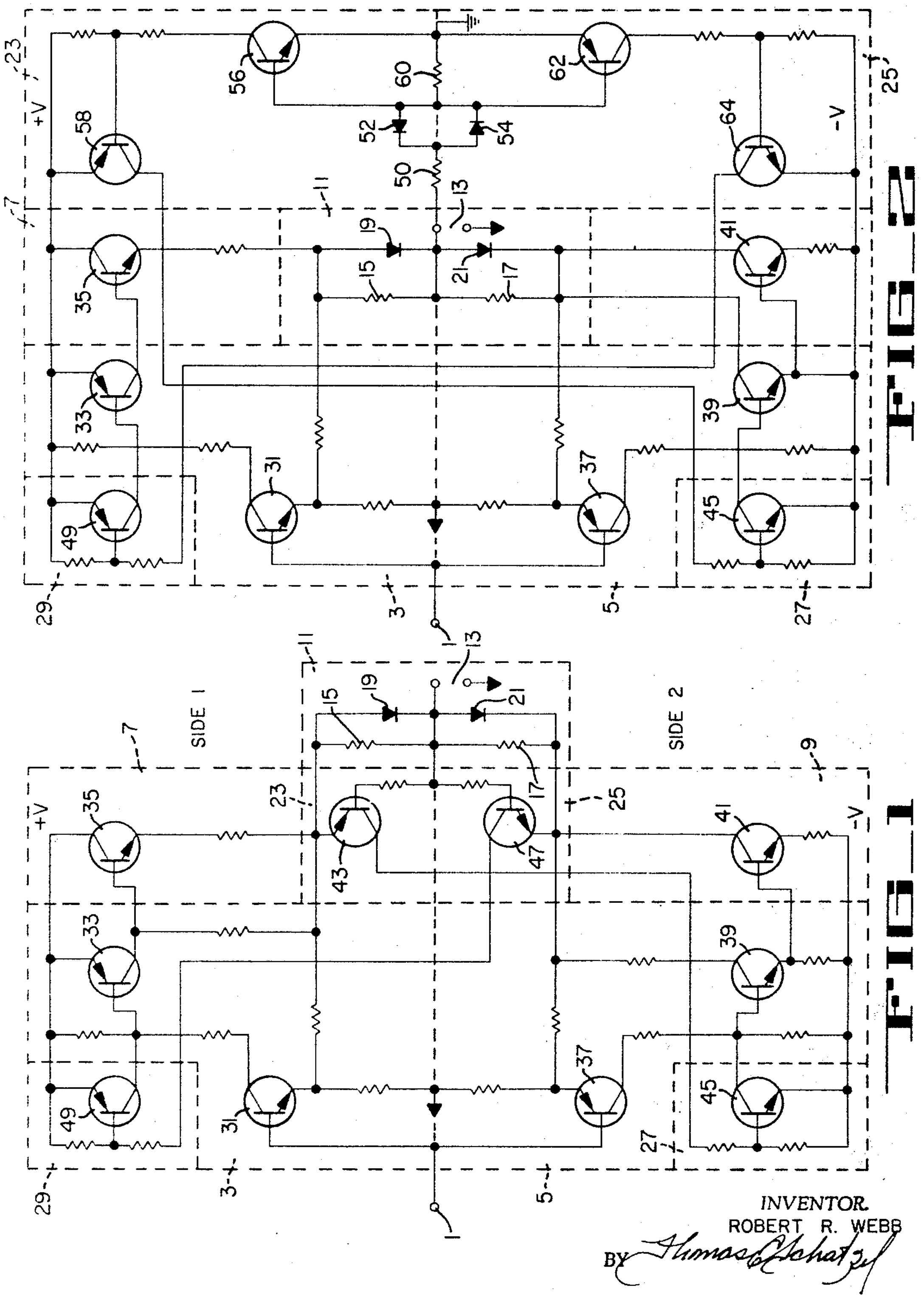
FIG. 1 is an illustration of a circuit diagram of a Class B amplifier incorporating the teachings of the present invention in which the output current of each side of the amplifier is sensed.
FIG. 2 is a circuit diagram of a Class B amplifier incorporating the teachings of the present invention in which the output voltage of each side is sensed.

Referring to FIG. 1, the illustrated Class B amplifier comprises two major sections designated Side One and Side Two. Each side is further sectioned in functional blocks. An input signal, which may vary between positive and negative relative levels, is received at an input terminal means 1. Receiving the input signal are a pair of driver stages 3 and 5 coinciding with Side One and Side Two, respectively. As illustrated, the driver stage 3 is responsive to positive input signals and stage 5 to negative input signals. The outputs of the driver stages 3 and 5 are respectively received by a pair of power gain stages 7 and 9 which are, in turn, joined to an output network 11 including an output terminal means 13, a pair of output load resistors 15 and 17 respectively in parallel with a pair of unidirectional conducting devices designated in the form of diodes 19 and 21. Depending upon whether Side One or Side Two is conducting, a positive or negative output signal appears across one of the load resistors 15 or 17. The output across the load resistor 15 is sensed by a sensor means 23 and the output across the load resistor 17 is sensed by a sensor means 25. The sensor means 23 extends to a gating network 27 tied to the driver stage 5 of Side Two. At the same time the sensor means 25, which is of opposite conductivity to that of the sensor 23, responds to the signal across the load resistor 17 of Side Two and extends to a gating network 29 tied to the driver stage 3 of Side One.

The theoretical operation of the circuit network of FIG. 1 is believed to be as hereinafter stated. Broadly, the sensor 23 senses a positive output signal across the load resistor 15 of the output network 11 indicative that Side One is conducting. The sensor 23 provides a sensing signal to the gate 27. The gate 27 responds and conducts thus providing a low impedance path across the driver stage 5 so that it cannot assume a conductive condition while a positive output signal appears across the output resistor 15. The sensor 25 senses a negative output signal across the load resistor 17 which is indicative of the conductive status of Side Two. The sensor 25 provides a signal to the gate 29 which then assumes a conductive state thereby providing a low impedance path across the driver 3 of Side One, in turn, preventing conduction within Side One while a negative output appears across the output resistor 17.

More specifically, the driver stage 3 includes an NPN transistor 31 with the collector extending to a positive bias source V and the emitter simultaneously to a ground reference and the load resistor 15. Also joining the collector of the driver transistor 31 is the base of a PNP transistor 33. The emitter of the transistor 33 extends to the positive potential source V and the collector extends to the load resistor 15 and the power gain stage 7 where it is received at the base of an NPN transistor 35 which may be the first stage of an emitter follower power amplifier network. The emitter of the transistor 35 extends to the load resistor 15 and the collector to the positive potential source V. Accordingly, when a positive signal is received at the input terminal means 1, the transistor 31 conducts as does the transistor 33 and the power gain network comprising the transistor 35. Consequently, an output signal appears across the load resistor 15 and the output terminal means 13.

Side Two of the amplifier of FIG. 1 reacts similarly to a negative signal received at the input terminal means 1. Side Two includes a driver stage 5 having a PNP transistor 37, with the emitter extending to the ground reference and the load resistor 17. The collector extends to the negative side of the potential source V and the base of an NPN transistor 39. The emitter of the transistor 39 extends to the negative side of the potential source V and to the power gain stage 9 where it is received at the base of the NPN transistor 41. The emitter of the transistor 41 extends to the negative side of the potential source V and the collector to the load resistor 17. Upon receipt of a negative signal at the input terminal means 1, the transistor 37 conducts as does the transistor 39 and the power gain network comprising the transistor 41. Consequently, an amplified negative output signal appears across the load resistor 17 and the output terminal means 13.

The Class B amplifier in FIG. 1 is modified in accordance with the present invention by including the pair of sensor means 23 and 25 which sense the polarity of the output current. The sensor means 23 includes a PNP transistor 43 with the emitter and the base extending across the load resistor 15. The collector of transistor 43 extends to the gating network 27. Accordingly, when a positive output signal appears across the load resistor 15, transistor 43 conducts providing a conductive path through the collector to the gate 27. The gate 27 includes an NPN transistor 45 of which the base is tied to the collector of the transistor 43, the emitter to the negative side of the potential source V and the collector to the base of the transistor 39. Consequently, when the transistor 43 conducts, the transistor 45 responds and assumes a conductive state thereby essentially shorting the base to the emitter of the transistor 39. This places the transistor 39 in a non-conductive state. Thus, Side Two remains in a non-conductive state while the transistor 43 conducts assuring that when Side One conducts, Side Two does not simultaneously conduct.

Likewise, when Side Two conducts and a negative signal appears across the load resistor 17, this condition is sensed by the sensor 25. The sensor 25 includes an NPN transistor 47 with the emitter and the base extending across the load resistor 17. The collector of the transistor 47 extends to the gate 29 where it is received by the base of a PNP transistor 49. The emitter of the transistor 49 extends to the positive side of the potential source V and the collector to the base of the transistor 33 of the power stage 3. Consequently, when the transistor 47 conducts responsive to a signal across the load resistor 17, the signal on the collector of the transistor 47 places the transistor 49 in a conductive state. This essentially short circuits the base to the emitter of the transistor 33 thereby placing Side One in a non-conductive state when Side Two conducts.

Referring to the embodiment of FIG. 2, the output of the Class B amplifier is sensed by a voltage detecting means in contrast to the current sensing means in FIG. 1. In FIG. 2 the networks and components similar to those of FIG. 1 carry the same numerals and will not be further described. The primary deviation of FIG. 2 from FIG. 1 is in the sensing means 23 and 25 which now sense the polarity of the output voltage. The sensors 23 and 25 include a common input resistance 50 tied in common to a pair of diodes 52 and 54 connected in opposite polarities. The anode of the diode 52 joins the base of an NPN transistor 56, the collector of which extends through biasing resistance to the positive side of the potential source V. Also tied to the positive side of the potential source V is the emitter of a PNP transistor 58 the collector of which extends to the gate network 27. The base of the transistor 58 extends to the collector of the transistor 56. The emitter of the transistor 56 is grounded as is a resistance 60 which is common to the junction of the diodes 52 and 54. The sensor 25 includes a PNP transistor 62 the emitter of which is grounded. The base of the transistor 62 is common to the junction of the diode 52, the resistor 60 and the base of the transistor 56. The collector of the transistor 62 extends through a resistance means to the negative side of the potential source V and to the base of an NPN transistor 64. The emitter of the transistor 64 is tied to the negative side of the potential source V while the collector extends to the gate 29.

The theoretical operation is believed to be such that when the output voltage across the output terminal means 13 is positive, the transistor 56 conducts thereby placing the transistor 58 in a conductive state, in turn, providing a current to the transistor 45 of the gating network 27. This places the transistor 45 in a conductive state thereby shorting the base and emitter of the transistor 39 as previously discussed in connection with FIG. 1. When the output across the output terminals 13 is negative the transistor 62 conducts which in turn places the transistor 64 in a conductive state. A signal is provided to the gate means 29 thereby placing the transistor 49 in conduction and shorting the base and emitter of the transistor 33.

The herein described networks have proven highly beneficial for incorporation in solid state Class B amplifiers used to drive DC motors. As is well known to those skilled in the art, with solid state electronics it is necessary that when overloads are presented that there be very rapid response in removing the overload to avoid destruction of the overload devices and to prevent overloading of other components. It should be appreciated that the network is a very economical network and its simplified nature makes it feasible for incorporation in present Class B amplifiers. Also, it is apparent that the device may be utilized in similar circuit structures where stages are responsive to incoming signals of opposite polarity and simultaneous conduction is unfavorable.

I claim:

1. A network for preventing simultaneous conduction in two networks responsive to input signals of opposite polarity comprising in combination:

an input terminal means;

an output terminal means;

a first network intermediate the input and output terminal means and adapted to assume a conductive state for positive input signals and provide a responsive output signal at the output terminal means;

a second network intermediate the input and output terminal means and adapted to assume a conductive state for negative input signals and provide a responsive output signal at the output terminal means;

a sensing means for sensing the polarity of the output signal at the output terminal means, the sensing means including a pair of transistor stages of which one is biased to assume a conductive state and provide a sensing signal when the output signal is positive and the other biased to assume a conductive state and provide a sensing signal when the output signal is negative; and gating means associated with the first network and second network, the gating means adapted for receiving said sensing signals and placing the first network in a non-conductive state when said sensing signals indicate an output signal of one polarity and the second network in a non-conductive state when said sensing signals indicate an output signal of the other polarity.

2. The network of claim 1 in which, the first network is one side of a Class B amplifier; and the second network is the other side of a Class B amplifier.

3. The network of claim 1 in which, the gating means includes a first transistor stage adapted for assuming a conductive state responsive to the conductive state of one sensing transistor, the first transistor stage extending across one side of the Class B amplifier and adapted to provide a low impedance path across the input of said one side when said first transistor stage is in a conductive state, and a second transistor stage adapted for assuming a conductive state responsive to the conductive state of the other sensing transistor, the second transistor stage extending across the other side of the Class B amplifier and adapted to provide a low impedance path across the input of said other side when said second transistor stage is in a conductive state.

4. The network of claim 3 in which the sensing means includes a network responsive to the polarity of the output current of the Class B amplifier.

5. The network of claim 3 in which the sensing means includes a network responsive to the polarity of the output voltage of the Class B amplifer.

References Cited

UNITED STATES PATENTS 2,785,236 3/1959 Bright et al. ------- 330—15 X

ROY LAKE, *Primary Examiner.*

S. H. GRIMM, *Assistant Examiner.*

U.S. Cl. X.R.

330—15, 17, 19, 20, 144